United States Patent [19]

Metz et al.

[11] 3,930,030

[45] Dec. 30, 1975

[54] PROCESS FOR MAKING A BARBECUE SAUCE WITH TENDERIZER

[75] Inventors: Ferdinand E. Metz, Glenshaw; Finis O. Boyce, Bridgeville; James L. Segmiller, Pittsburgh, all of Pa.

[73] Assignee: H. J. Heinz Company, Pittsburgh, Pa.

[22] Filed: Feb. 27, 1975

[21] Appl. No.: 553,669

[52] U.S. Cl................................. 426/63; 426/281
[51] Int. Cl.².......................................... A23L 1/31
[58] Field of Search........................ 426/56, 63, 281

[56] References Cited
UNITED STATES PATENTS
3,740,234   6/1973   Price et al........................... 426/281

OTHER PUBLICATIONS

Roberson et al., "The Complete Barbecue Book," 1951, Published by Prentice–Hall, Inc., New York, pp. 224–228.

Primary Examiner—Hyman Lord
Attorney, Agent, or Firm—Paul & Paul

[57] ABSTRACT

A novel barbecue sauce having a tenderizing agent, namely, the proteolytic enzyme papain substantially free of amylase, incorporated therein and stabilized against loss of proteolytic activity, is provided by the present invention together with a process for making the same.

2 Claims, No Drawings

PROCESS FOR MAKING A BARBECUE SAUCE WITH TENDERIZER

BACKGROUND OF THE INVENTION

A. Field of the Invention

The present invention relates to the art of food treatment and, more specifically, to the art of rendering meat and like protein-containing foods more tender and palatable by treatment with a liquid sauce. More particularly, the present invention relates to the art of providing a flavor enhancing and meat tenderizing barbecue sauce containing amylase free papain in a low pH environment which protects the papain from loss of proteolytic activity until the barbecue sauce is applied to the meat to be tenderized at which time the proteolytic activity is initiated.

B. Description of the Prior Art

It has long been known that proteolytic enzymes, and papain in particular, can be used to tenderize protein-containing foods, such as meat, fish or fowl.

Papain, the proteolytic enzyme utilized in the present invention, is most commonly derived commercially from the unripe fruit of the tropical papaw tree (Carica papaya). In this form, it contains impurities which heretofore have not been considered significant. However, in the practice of the present invention, it is important to remove substantially all of the amylase prior to incorporation of the papain into the low pH carrier hereinafter described.

In the prior art, papain has been used as a meat tenderizer both in dry granular form and in aqueous solutions. However, it has long been recognized that papain gradually loses its proteolytic activity during storage and particularly where the papain is in aqueous solution. It has been found that this loss of proteolytic activity in compositions containing papain is reduced by incorporating buffering agents capable of maintaining the pH level in the range from about pH 5.5 to about pH 5.8.

While the proteolytic activity of aqueous papain solutions buffered to pH levels in the range above pH 5.5 is satisfactory for some purposes of meat tenderizing, the use of buffered aqueous solutions of this type is subject to serious disadvantages where the object is to provide the ultimate consumer with a product which is acceptable for simultaneous imparting flavor and tenderness to meat products. These disadvantages have been overcome by the present invention in which papain substantially free of amylase is incorporated in a carrier which is at a pH substantially below pH 5 and which, in addition, is in the form of a liquid sauce having flavor-imparting characteristics. We have made the surprising discovery that papain is stabilized against loss of proteolytic activity at pH levels below pH 5 and preferably at about pH 3.5 in such a liquid sauce, provided the papain is first rendered substantially free of amylase. We have further discovered that amylase-free papain in such a low pH liquid sauce environment is effective as a meat tenderizer on application of the sauce to meat products.

The prior art does not indicate that it would be possible to incorporate papain into food additive products having a very low pH such as pH 3.5. As a result, only a limited choice of application vehicles, that is, those having a pH of between 5.5 – 7, have been available as carriers for papain in a form which would maintain the potency and activity of the proteolytic enzyme as a meat tenderizing agent.

SUMMARY OF THE INVENTION

In accordance with the present invention, a meat tenderizing barbecue sauce is provided having a pH below pH 5 and containing the proteolytic enzyme papain substantially free of amylase. Expressed in broader terms, the present invention is directed to providing a substantially amylase-free papain stabilized in a carrier having a pH substantially lower than pH 5 in the form of a flavor imparting sauce having meat tenderizing characteristics by virtue of the presence of the stabilized, amylase-free papain.

The novel barbecue sauce for tenderizing and enhancing the flavor of protein-containing food which is provided by the present invention comprises amylase-free papain in combination with tomato paste, sugar, gum-oil, salt, spices, garnishes, preservative agents, vinegar and water. The pH of this barbecue sauce product preferably is about 3.5.

The novel barbecue sauce of the present invention is prepared by a process consisting of the steps of:

a. providing an aqueous mixture of spices and preservative at about 160°F., then;

b. adding tomato paste, sugar, gum-oil and salt to said mixture with agitation, while maintaining the temperature thereof between 175° – 190°F. for about 15 minutes, then;

c. milling the mixture in a Rietz mill or the like, then;

d. deaerating and cooling the mixture to about 120°F., and then;

e. adding vinegar, oils and garnishes and amylase-free papain to the mixture with agitation, while maintaining the temperature of the mixture at about 120°F. whereby the pH of the mixture is brought to about pH 3.5.

Accordingly, it is the primary object of the present invention to provide a food treatment product for tenderizing and enhancing the flavor of protein-containing food.

It is a further object of this invention to provide a novel barbecue sauce which contains a potent yet stabilized food tenderizing agent, namely, the proteolytic enzyme papain, which is an effective tenderizer of meat and other protein-containing foods.

It is a still further object of the present invention to provide a process whereby a novel meat tenderizing barbecue sauce can be prepared in a commercially feasible manner in a substantially stable form.

It is yet a further object of the present invention to provide a process whereby protein-containing food can be simultaneously tenderized and enhanced in flavor by treating the same with a barbecue sauce containing amylase-free papain.

Other objects and advantages of the novel barbecue sauce of the present invention will be readily apparent to those skilled in the art through the study of the following description of the preferred embodiment and the appended claims.

DESCRIPTION OF THE PREFERRED EMBODIMENT

In the preferred embodiment of the present invention, a barbecue sauce is prepared in accordance with the following process.

At ambient temperature, the various spices and preservatives are mixed in water and this starting mixture is heated to a temperature of about 160°F. After this temperature has been reached, tomato paste, a "barbecue mix" comprising sugar and salt, along with gum-oil, are added to the starting mixture to form a first phase mixture having a pH of about 4.0. This first phase mixture is then heated to between 175° – 190°F. and held at this temperature for a hold-period of about 15 minutes.

Thereafter, the first phase mixture is milled by conventional means, whereupon the temperature of the mixture drops to about 180°F. The milled mixture is then deaerated, also by conventional means, whereupon the temperature of the mixture drops to about 120°F.

In the second phase of the process, the mixture leaving the deaerator at about 120°F. is maintained at that temperature while vinegar, oils, garnishes and amylase-free papain are added with agitation to complete the sauce and to bring its pH down to about pH 3.5.

The sauce is once again deaerated, whereupon the temperature of the same drops to about 95°F. and, finally, it is cooled to about 80°F., at which temperature the barbecue sauce may be appropriately packaged in containers, as desired.

The novel barbecue sauce of the present invention, prepared in accordance with the foregoing process, comprises, on a weight basis, between 0.05 – 0.20% amylase-free papain in combination with 12 – 18% tomato paste, 21 – 26% sugar, 0.007 – 0.01% gum-oil, 3.75 – 5.0% salt, 2.0 – 2.5% spices, 0.5 – 2.0% garnishes, 0.1 – 0.15% preservative agents, 12.5 – 15% vinegar and 33 – 48% water. The pH of the finished barbecue sauce is about 3.5.

For purposes of the present invention, it is to be understood that the source of the papain and the manner in which it is derived therefrom are immaterial, provided that the papain is essentially free from amylase.

The spices which may be used in the barbecue sauce of the present invention include, but are not limited to, the following: allspice, cinnamon, mace, oregano, sage.

Likewise, the garnishes which may be used in accordance with the present invention include, but are not limited to, the following: onions, mushrooms, red peppers.

Furthermore, the preservative agents which may be used in the preparation of a barbecue sauce of the present invention include, but are not limited to, the following: sodium benzoate, potassium sorbate.

While it is not our intention to limit the present invention to any single theory, it is thought that the maintenance of the potency and proteolytic activity of the papain results from the substantial absence of amylase and the low pH environment in which the papain is kept in the barbecue sauce of the present invention prior to use. Furthermore, it is thought that upon application to meat, which has a pH in the range of about 6.0 – 7.0, the papain migrates from the barbecue sauce at the surface interface with the meat whereupon it enters a higher pH environment in which it can effectively act as a tenderizing agent. While the exact manner in which the amylase-free papain penetrates into the meat and then uniformly tenderizes the same throughout is not completely understood at this time, it is thought that osmotic pressure and the initial low pH of the carrier sauce and its consistency are the primary contributing factors to such penetration, and that the rise in pH from pH 3.5 to pH 6.5 or higher after application to the meat accounts for the onset of the tenderizing action.

The following example provides one preferred embodiment of the present invention, although it is fully within the purview thereof that various modifications and substitutions of ingredient proportions may be made by those skilled in the art, all within the purview of the invention and the scope of the appended claims. It should be noted that starches may be used as thickening agents, if desired.

EXAMPLE 1

In accordance with the present invention, a barbecue sauce with tenderizer was prepared in the following manner.

First, the various pre-batch operations were conducted. A barbecue mix was prepared by dissolving 950 lbs. of sugar with 87.5 lbs. of salt in 250 lbs. of water. A gum-oil mix was prepared by dispersing 17.5 lbs. of guar gum in 25 lbs. of vegetable oil and mixing until the dispersion was free of lumps. A preservative-spice slurry was prepared by dissolving 6.5 lbs. of preservatives in 250 lbs. of water and then adding 50 lbs. of spices and mixing until uniform. A garnish mix was prepared by adding 25 lbs. of minced, dehydrated onions to 225 lbs. of water and boiling for 1 minute. A papain solution was prepared by dissolving 3 lbs. of papain in 50 lbs. of water at a temperature of about 60°F. The oil mix used in this example consisted simply of 4 lbs. of vegetable oil.

In the first phase of the batch process, the sweetener mix, preservative-spice slurry and the gum-oil mix were pumped into a first phase cook kettle and mixed with 100 lbs. of water and 625 lbs. of tomato paste. In the process of deaerating the mixture, the temperature thereof was adjusted to about 120°F.

In the second phase of the batch process, 1175 lbs. of the first phase mixture was delivered into a second phase cook kettle, followed by addition of 275 lbs. of 100-grain vinegar, 25 gm. of the oil mix and 250 lbs. of the garnish mix. This second phase mixture was then gauged to a volume of 1775 lbs. by addition of water and the temperature was adjusted to below 130°F. The papain solution prepared previously was then added and the final gauging and consistency adjustments were made so that 200 gal. of the barbecue sauce was obtained. The barbecue sauce product which was thus prepared was then deaerated and filled at between 90° – 95°F. into suitable containers.

The papain activity of the barbecue sauce product with tenderizer was then analyzed by preparing several types of meat and meat products, both with and without the barbecue sauce containing tenderizer. Comparisons were made, including taste panel organoleptic evaluation and shear-press texture measurements, in order to determine the tenderness of the meat and meat products.

The effectiveness of the barbecue sauce of the present invention in tenderizing meat, or like protein-containing foods, was clearly observed.

What is claimed is:

1. A process for making a barbacue sauce for tenderizing and enhancing the flavor of protein-containing food consisting of
   a. providing an aqueous mixture of spices and preservatives at about 160°F.,
   b. adding tomato paste, sugar, gum-oil and salt to said mixture with agitation while maintaining the temperature thereof between 175° – 190°F. for about 15 minutes,
c. milling said mixture at about 180°F.,
d. deaerating and cooling said mixture to 120°F., and then
e. adding vinegar, oils, garnishes and papain substantially free of amylase to said mixture with agitation while maintaining the temperature thereof at about 120°F., and thereby bringing the mixture to a pH of about 3.5.

2. The process of claim 1 including the additional step of treating a protein-containing food with the resulting mixture.

* * * * *